United States Patent
Lin et al.

(10) Patent No.: US 12,425,895 B2
(45) Date of Patent: Sep. 23, 2025

(54) THROUGHPUT ESTIMATION FOR A WIRELESS DEVICE

(71) Applicant: NETGEAR, Inc., San Jose, CA (US)

(72) Inventors: Yu Te Lin, Kaohsiung (TW); Deeksha Kamath, San Jose, CA (US); Sreekar Adapa, Richmond, CA (US); Fernando Lozano, Woodside, CA (US)

(73) Assignee: NETGEAR, INC., San Jose, CA (US)

( * ) Notice: Subject to any disclaimer, the term of this patent is extended or adjusted under 35 U.S.C. 154(b) by 355 days.

(21) Appl. No.: 18/159,039

(22) Filed: Jan. 24, 2023

(65) Prior Publication Data
US 2024/0251264 A1    Jul. 25, 2024

(51) Int. Cl.
| | |
|---|---|
| H04B 17/24 | (2015.01) |
| H04B 17/26 | (2015.01) |
| H04B 17/40 | (2015.01) |
| H04L 43/00 | (2022.01) |
| H04L 43/0829 | (2022.01) |
| H04L 43/0888 | (2022.01) |
| H04W 24/06 | (2009.01) |
| H04W 24/08 | (2009.01) |
| H04W 24/10 | (2009.01) |
| H04W 80/02 | (2009.01) |
| H04W 84/12 | (2009.01) |
| H04W 88/02 | (2009.01) |
| H04W 88/08 | (2009.01) |
| H04W 92/02 | (2009.01) |
| H04W 92/10 | (2009.01) |
| H04W 92/18 | (2009.01) |
| H04W 92/20 | (2009.01) |

(52) U.S. Cl.
CPC ............ H04W 24/08 (2013.01); H04B 17/24 (2015.01); H04B 17/26 (2015.01); H04B 17/40 (2015.01); H04L 43/0829 (2013.01); H04L 43/0888 (2013.01); H04L 43/14 (2013.01); H04W 24/06 (2013.01); H04W 24/10 (2013.01); H04W 80/02 (2013.01); H04W 84/12 (2013.01); H04W 88/02 (2013.01); H04W 88/08 (2013.01); H04W 92/02 (2013.01); H04W 92/10 (2013.01); H04W 92/18 (2013.01); H04W 92/20 (2013.01)

(58) Field of Classification Search
CPC . H04B 17/0082–409; H04L 43/02–55; H04W 24/02–10; H04W 28/02–26; H04W 48/02–20; H04W 80/02–12; H04W 84/005–22; H04W 88/005–188; H04W 92/02–24
See application file for complete search history.

(56) References Cited

U.S. PATENT DOCUMENTS

| | | | | |
|---|---|---|---|---|
| 2003/0161341 | A1* | 8/2003 | Wu | H04W 24/06 |
| 2012/0230206 | A1* | 9/2012 | Baliga | H04W 24/06 |
| 2013/0301441 | A1* | 11/2013 | Russell | H04W 24/06 |

* cited by examiner

Primary Examiner — Timothy J Weidner
(74) Attorney, Agent, or Firm — Perkins Coie LLP

(57) ABSTRACT

Techniques, apparatuses, and systems for throughput estimation for a wireless device are disclosed. Throughput estimation includes generating network traffic for transmission between two nodes. The first node transmits the network traffic to the second node. The first node receives an acknowledgement from the second node that indicates successful receipt of the network traffic. The first node determines an amount of data successfully transmitted between the two nodes based on the reception of the acknowledgement. A throughput estimate is determined based on the amount of data successfully transmitted between the two nodes.

19 Claims, 8 Drawing Sheets

```
VAP Level Stats:   ath3   (under radio wifi3)
Tx Data Packets                    =  0
Tx Data Bytes                      =  0
Tx Offer Data Packets              =  72868
Tx Offer Data Bytes                =  10562153
Tx Data Payload Bytes              =  0
Tx Eapol Packets                   =  0
Rx Data Packets                    =  0
```

$$Throughput = \frac{\Delta d}{\Delta t} * C$$

C : A constant factor

| Device | 402B | 402C |
|---|---|---|
| Estimated Speed | $\dfrac{1}{\frac{1}{TP1}}$ | $\dfrac{1}{\frac{1}{TP1}+\frac{1}{TP2}}$ |

THROUGHPUT ESTIMATION FOR A WIRELESS DEVICE

TECHNICAL FIELD

The present disclosure is generally related to deploying wireless connectivity.

BACKGROUND

Homes and offices deploy a wireless access device to provide client devices access to a network, such as the Internet, through connection with the wireless access device. Users benefit from wireless networks that communicate data quickly and reliably. The speed and reliability of wireless networks vary based on the location of the wireless access device or the client devices. For example, at some locations, the throughput of the network decreases due to interferences or increased communication distances between the wireless access device and the client device. Some networks utilize a mesh of wireless devices to improve the coverage or performance of the wireless network. Network providers analyze the performance of the network while the wireless devices are in different locations to determine the optimal layout of the network devices. Current techniques for measuring network performance, however, may require additional tools or the deployment of a service technician.

DETAILED DESCRIPTION

Figures 1, 2, 3:
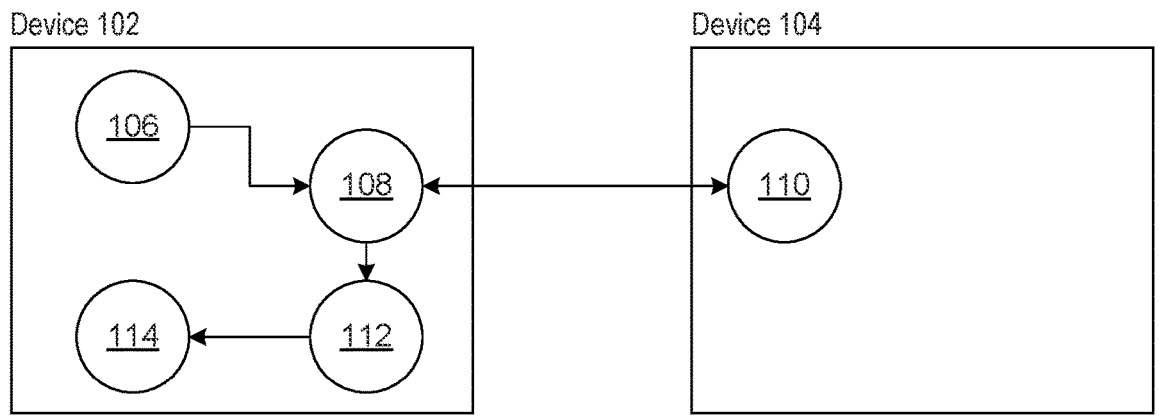
FIG. 1 illustrates an example system flow for throughput estimation for a wireless device.
FIG. 2 illustrates example data used to estimate throughput for a wireless device.
FIG. 3 illustrates an example equation for throughput estimation for a wireless device.

Embodiments of the present disclosure will be described more thoroughly from now on with reference to the accompanying drawings. Like numerals represent like elements throughout the several figures. Embodiments of the claims can be embodied in many different forms and should not be construed as limited to the embodiments set forth herein. The examples set forth herein are non-limiting examples and are merely examples among other possible examples. Throughout this specification, plural instances (e.g., "812") implement components, operations, or structures (e.g., "812A") described as a single instance. Further, plural instances (e.g., "633") refer collectively to a set of components, operations, or structures (e.g., "633A") described as a single instance. The description of a single component (e.g., "633A") applies equally to a like-numbered component (e.g., "633B") unless indicated otherwise. These and other aspects, features, and implementations are be expressed as methods, apparatuses, systems, components, program products, means or steps for performing a function, and in other ways. These and other aspects, features, and implementations will become apparent from the following descriptions, including the claims.

The embodiments disclosed herein describe methods, apparatuses, and systems for throughput estimation for a wireless device. In embodiments, throughput are estimated for a network, such as a wireless local area network (LAN). In aspects, a network access device of the network generates network traffic used to estimate throughput. The network access device transmits (e.g., during a time window) the network traffic to a wireless device connected to the network access device. The wireless device receives the network traffic and transmit an acknowledgement that indicates successful receipt of the network traffic. The wireless access device receives the acknowledgement during the time window and determines an amount of data successfully transmitted between the network access device and the wireless device based on the reception of the acknowledgement. In embodiments, a throughput estimate is determined based on the amount of data successfully transmitted between the network access device and the wireless device and the amount of time elapsed during the time window. Accordingly, the present technology can be used to estimate throughput between two nodes.

The advantages and benefits of the methods, systems, and apparatuses disclosed herein include enabling network analysis without requiring an additional application or tool. For example, statistics relating to the transmission of network traffic between two nodes can be collected without intervention from additional monitoring/analyzing tools. The statistics are used to estimate throughput between the two nodes. Thus, the present technology are used to analyze network statistics without requiring interaction with the client device. In this way, network analysis is performed for additional devices, such as those that are not capable of installing additional applications. Moreover, throughput can be used to determine the optimal location for wireless devices (e.g., a router or mesh node) connected to the network, without requiring additional knowledge of the network. Accordingly, users can troubleshoot or improve their network without requiring support from a network technician.

Throughput Estimate

FIG. 1 illustrates an example system flow for throughput estimation for a wireless device. In aspects, a wireless device includes any device capable of wireless communication. The system flow includes a device 102 and a device 104. In aspects, the device 102 or the device 104 includes any wireless device. In aspects, the device 102 includes a wireless access device, such as a router, modem, switch, access point, mesh node, etc. in embodiments, the wireless access device is a wireless networking hardware device that allows other wireless communication devices to connect to a wired network. Embodiments of a wireless access device are described in further detail with respect to FIGS. 5 and 6. In some embodiments, the device 104 includes a wireless device, such as a mesh node or a client device. A mesh node includes a wireless networking hardware device that is capable of forwarding wireless communication signals between a wireless access device and a client device (e.g., through one or more other mesh node). In some cases, multiple mesh node devices are implemented throughout a wireless network to improve the coverage or performance of the wireless network. In aspects, a client device includes any number of wireless communication devices, for example, a mobile phone, tablet, wearable device, laptop, Internet-of-Things (IoT) device, and so on.

The device 104 is be connected with the device 102 to enable wireless communication between the devices. The device 102 provides network access to a network, such as the Internet, through the device 102. For example, the device 102 and the device 104 include Wi-Fi devices capable of communicating in accordance with Institute of Electrical and Electronics Engineers (IEEE) 802.11. IEEE 802.11 provides several distinct radio frequency bands for use in Wi-Fi communications: 900 MHZ, 2.4 GHz, 3.6 GHz, 4.9 GHZ, 5 GHZ, 5.9 GHZ, 6 GHZ and 60 GHz. Each range is divided into a multitude of channels. In the standards, channels are numbered at 5 MHz spacing within a band (except in the 60 GHz band, where they are 2.16 GHz apart), and the number linearly relates to the center frequency of the channel. Embodiments of the wireless network are described in further detail with respect to FIG. 7.

Device 102 estimates the throughput of the wireless network between device 102 and device 104, as illustrated in FIG. 1. The system flow begins at 106, where network traffic is generated. The network traffic includes any collection of data to be transmitted from device 102 to device 104. The network traffic includes one or more data packets. In some cases, a separate application installed on the device 102 is not needed to generate the network traffic. For instance, the network traffic generation is performed below an application layer of the device 102. The network traffic is generated by a kernel-level process to eliminate overhead required by initiating packet generation and transmission from an application. For example, an application can initiate a thread that requests services from the kernel. If another process also requests services from the kernel, the requests can be scheduled and handled through priority. By generating the network traffic through a kernel-level tool (e.g., a kernel thread), scheduling overhead from the application layer can be eliminated.

In some embodiments, generation of the network traffic is offloaded to hardware or to a device driver (e.g., kernel-level driver). The network traffic is generated and provided directly to a device driver (e.g., without overhead from an application layer) for transmission. Details of the hierarchical framework of the network access device are further described with respect to FIG. 5.

At 108, the network traffic is transmitted from device 102 to device 104. In embodiments, the network traffic is transmitted within a time window, during which successful communication between the device 102 and the device 104 is monitored. In aspects, the network traffic transmission is offloaded to hardware or to a device driver. In this way, the network traffic transmission can be handled without involvement from upper layers (e.g., application layers) or additional software. In some implementations, the media access control (MAC) layer can control the transmission of the network traffic to the device 104. The MAC layer organizes the network traffic into packets appropriate for a particular transmission medium (e.g., with appropriate header information or buffer). The MAC layer can be responsible for framing and addressing the network traffic. Moreover, the MAC layer provides the network traffic to appropriate channels for transmission when transmission resources become available.

The MAC layer consists of two functional entities: the MAC sublayer and the MAC layer management entity (MLME). The MAC sublayer handles channel access, retransmission, packet fragmentation, and encryption. The MLME handles synchronization, power management, and connection management. In aspects, the MLME collects data indicative of transmission statistics (e.g., successful transmissions).

The network traffic can be transmitted in accordance with a communications protocol, such as IEEE 802.11. In accordance with IEEE 802.11, a device sends an acknowledgement in response to successful reception of a transmission. For example, at 110, device 104 receives the network traffic and transmit an acknowledgement of the successful reception, which is received by the device 102 at 108. In aspects, the device 104 need not include a separate application or have altered device settings to transmit the acknowledgement. Instead, the acknowledgement is generated and transmitted in accordance with IEEE 802.11. In aspects, this differs from other network monitoring techniques that require a separate application to be installed at the device 104 or require device settings to be altered to monitor successful data reception. Some devices (e.g., sensors, cameras, mesh nodes) cannot install separate monitoring applications or their device settings cannot be changed. Accordingly, some of the techniques disclosed herein enable network monitoring on additional, non-configurable devices. In aspects, the device 104 receive the network traffic and transmit the acknowledgement even while in a low-power mode, for example, when the display is turned off, when the battery is low, or when device resources are being utilized by another process. Accordingly, in some embodiments, the network traffic is transmitted from the device 102 to the device 104 without requiring large amounts of device resources.

At 112, statistics are collected that indicate the successfully delivered traffic from the device 102 to the device 104. In aspects, the network traffic is deemed successfully transmitted if an acknowledgement was received for the transmission (e.g., successful transmission at device 102, successful reception at device 104, successful transmission of acknowledgment at device 104, and successful reception of acknowledgment at device 102). In embodiments, the statistics are collected without requiring intervention from upper layers of the device 102 (e.g., a separate application). In this way, network monitoring can be performed without added processes or without requiring a separate monitoring tool or application. In some cases, the statistics are collected by the MLME in accordance with IEEE 802.11. For example, FIG. 2 illustrates example data collected by the MLME. The MLME collects data indicative of an amount of data successfully transmitted from the device 102 to the device 104. As illustrated, the MLME records the number of bytes successfully transmitted from the device 102 to the device 104 (e.g., in the time window during which the communication is monitored). In embodiments, the statistics include an amount of time lapsed during the time window in which the communication is monitored (e.g., a time from transmission of the first frame of the network traffic at the device 102 to a reception of the last acknowledgment at the device 102).

Referring back to the system flow illustrated in FIG. 1, at 114, device 102 estimates the throughput using the statistics collected at 112. For example, FIG. 3 illustrates an example equation to estimate throughput. The throughput are estimated by dividing the amount of successfully transmitted traffic ($\Delta d$) by the amount of time lapsed during the time window ($\Delta t$) and adjusting by a constant. In aspects, the throughput is determined in bytes per unit time. As illustrated, the throughput estimation is performed by device 102. The throughput estimate can be determined without requiring intervention from an upper layer of the device 102. In other cases, however, the throughput may be estimated by a separate device (e.g., a remote server) that receives the statistics from the device 102.

In some implementations, the constant adjusts the throughput estimate for the overhead in transmitting the network traffic. The constant adjusts for overhead in transmitting or receiving the network traffic. In operation, a network access device primarily functions as a forwarding device between a network (e.g., the Internet) and a wireless device. During throughput estimation, however, the network access device can be tasked with generating network traffic, transmitting the network traffic, and receiving acknowledgement for the network traffic. Each of these processes can be performed with a certain amount of overhead, which the constant can adjust for. For example, a packet transmitted at 108 can include a header, which includes additional information relating to details of the transmission, and a payload, which includes the actual information to be communicated to the receiving device. As a result, communication bandwidth is used to transmit the header, thereby slowing the rate at which the payload is transmitted. Different communication protocols or different network traffic require different headers of varying width, which thus affect communication overhead. Accordingly, the constant can be determined based on header or packet width.

In embodiments, the constant by which the throughput is adjusted is determined based on previous comparisons between the throughput estimation technique detailed in the system flow illustrated in FIG. 1 (e.g., without adjusting by the constant) and another throughput measuring technique (e.g., performed by a physical technician). For example, the throughput estimation technique for the constant is used to estimate the throughput between a first device A and a second device B without adjusting by the constant factor. In aspects, a separate tool/application is connected/installed to device A during operation to measure the throughput between device A and device B. The throughput estimate (e.g., without the constant factor) is then compared to the throughput measurement determined from the tool or application, and the constant factor is determined as a number that, when multiplied by the throughput estimate, results in the throughput measurement. In some cases, this process is repeated multiple times, and the constant can be a combination (e.g., average) of the various constant factors. In embodiments, multiple possibilities for the constant factor are determined from the various comparisons. Then, when a throughput estimate is to be calculated, a particular constant factor is selected from the multiple possibilities (e.g., based on the communication overhead, packet width, header width).

Figure 8:
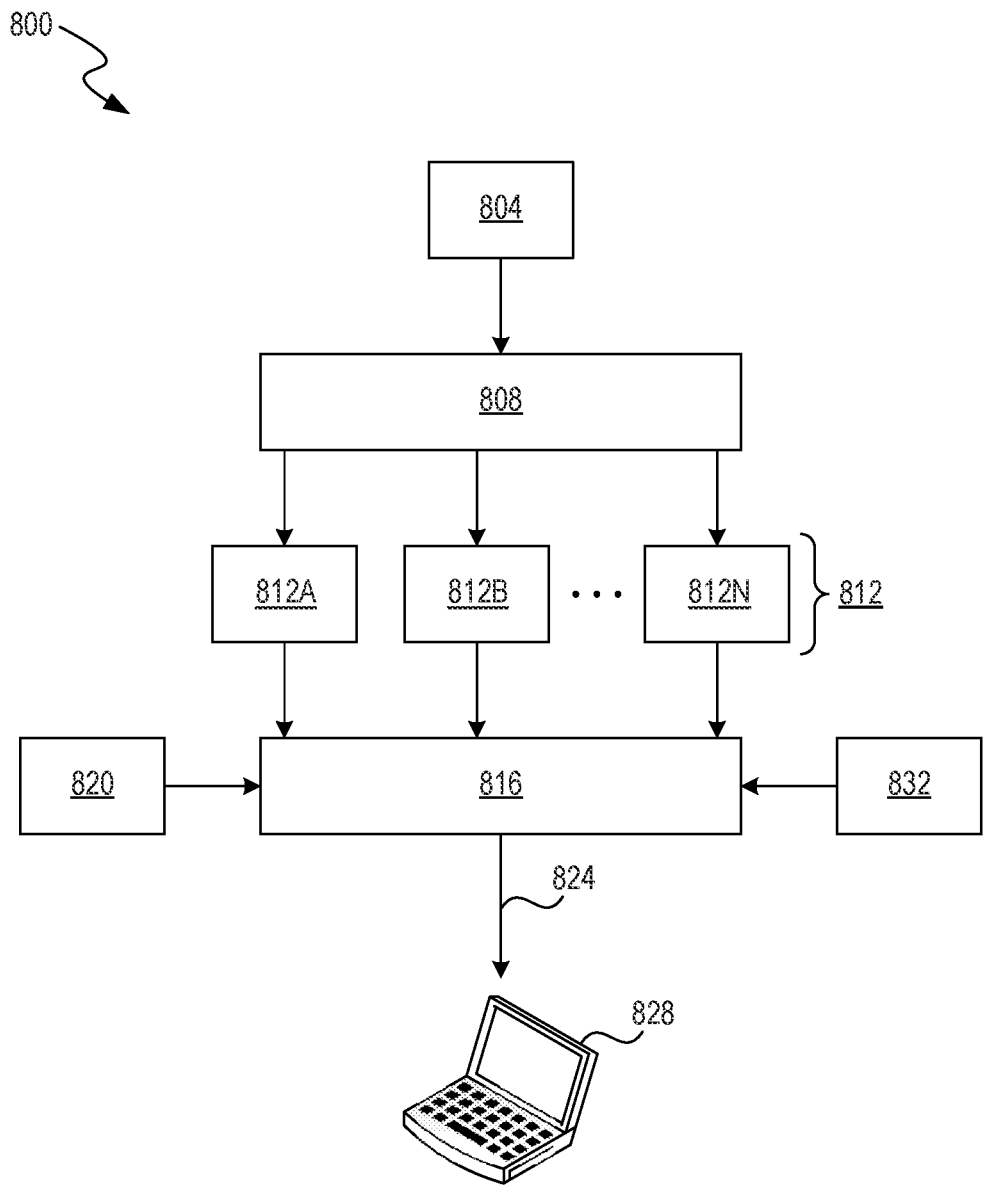
FIG. 8 illustrates an example machine learning (ML) system in accordance with one or more embodiments.

In embodiments, the constant is determined through ML, for example, using the ML system described in FIG. 8. In some cases, the constant is trained by comparing throughput estimates to additional throughput measuring techniques. For example, each throughput estimate is compared to a throughput measurement using a separate tool/application connected/installed to the network access device, and the ML system is trained to determine the constant using the comparison.

In embodiments, once the throughput has been estimated, it is communicated to one or more other devices. In some cases, the throughput estimate can be provided to a network provider of the wireless network, a manufacturer of the network access device, or to a wireless device connected to the network access device. In aspects, the network provider determines a quality of the network from the throughput estimate, for example, to troubleshoot the network or determine an optimal location for the network access device or additional mesh nodes. A user subscribed to the network views the throughput estimate through an account associated with the network provider. A manufacturer of the network access device can utilize the throughput estimate to improve the network access device or monitor the performance of the network access device. In yet another aspect, the throughput estimate is provided (e.g., transmitted) to the wireless device so that a user of the wireless device can determine the quality of the network connection, determine the optimal location for the network access device or additional mesh nodes, or troubleshoot the network. The throughput estimate is communicated to a user of the wireless device, for example, on a display of the wireless device or through a speaker of the wireless device.

Wireless Mesh Grid

Figures 4A, 4B:
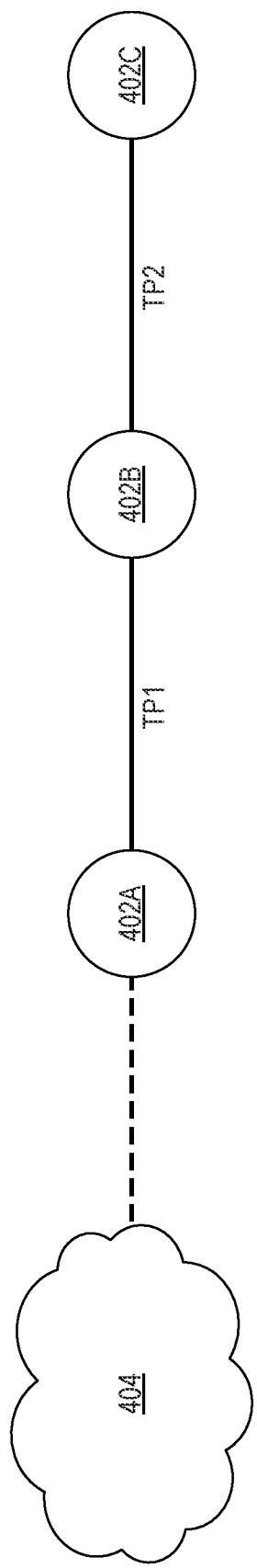
FIG. 4A illustrates an example network layout of multiple wireless devices in a wireless network.
FIG. 4B illustrates example equations for estimating throughput for the multiple wireless devices in the wireless network.

FIG. 4A illustrates an example network layout of multiple wireless devices in a wireless network. As illustrated, the network layout includes multiple wireless devices 402 connected to a network 404 (e.g., the Internet). The wireless devices 402 includes network access devices, mesh nodes, or client devices, among others. The wireless devices include a wireless device 402A connected to the network 404, a wireless device 402B connected to the network 404 through the wireless device 402A, and a wireless device 402C connected to the network 404 through the wireless device 402A and the wireless device 402B. As a specific example, the network layout implements a mesh of wireless devices. In embodiments, the wireless device 402A includes a network access device, the wireless device 402B can include a mesh node, and the wireless device 402C can include a client device.

As discussed with respect to FIGS. 1-3, the techniques disclosed herein can be used to measure the throughput between two wireless nodes. In some cases, however, the network includes an intermediate node (e.g., wireless device 402B) between two connected nodes (e.g., wireless device 402A and wireless device 402C). In aspects, the throughput between two nodes that are separated by an intermediate node are calculated from the individual throughputs between each of the two nodes and the intermediate node. For example, the throughput between wireless device 402A and wireless device 402B (TP1) is determined. In aspects, TP1 is calculated using the throughput estimation techniques discussed with respect to FIGS. 1-3. In embodiments, TP1 is determined at the wireless device 402A.

Similarly, the throughput between the wireless device 402B and the wireless device 402C (TP2) is determined (e.g., using the throughput estimation techniques described with respect to FIGS. 1-3). In embodiments, TP2 can be determined by the wireless device 402B. Using TP1 and TP2, an estimation for the throughput between the wireless device 402A and the wireless device 402C is determined. For example, TP2 is be transmitted from the wireless device 402B to the wireless device 402A. Then, the wireless device 402A utilizes TP2, which was received from the wireless device 402B, and TP1, which was determined by the wireless device 402A, to determine the throughput estimation between the wireless device 402A and the wireless device 402C using the equations illustrated in FIG. 4B.

FIG. 4B illustrates example equations for estimating throughput for the multiple wireless devices in the wireless network. As illustrated, the throughput between two nodes is determined as the inverse of a sum of the inverses of each throughput between directly connected nodes on a communication path between the two nodes. For example, the only connection path between wireless device 402A and wireless device 402B is the connection path between wireless device 402A and wireless device 402B. Accordingly, the throughput between wireless device 402A and wireless device 402B is simply TP1. The connection path between wireless device 402A and wireless device 402C, however, includes a connection between wireless device 402A and wireless device 402B and a connection between wireless device 402B and wireless device 402C. In this way, the throughput between wireless device 402A and the wireless device 402C is calculated as the inverse of the sum of the inverse of TP1 and the inverse of TP2.

Wireless Access Device

Figure 5:
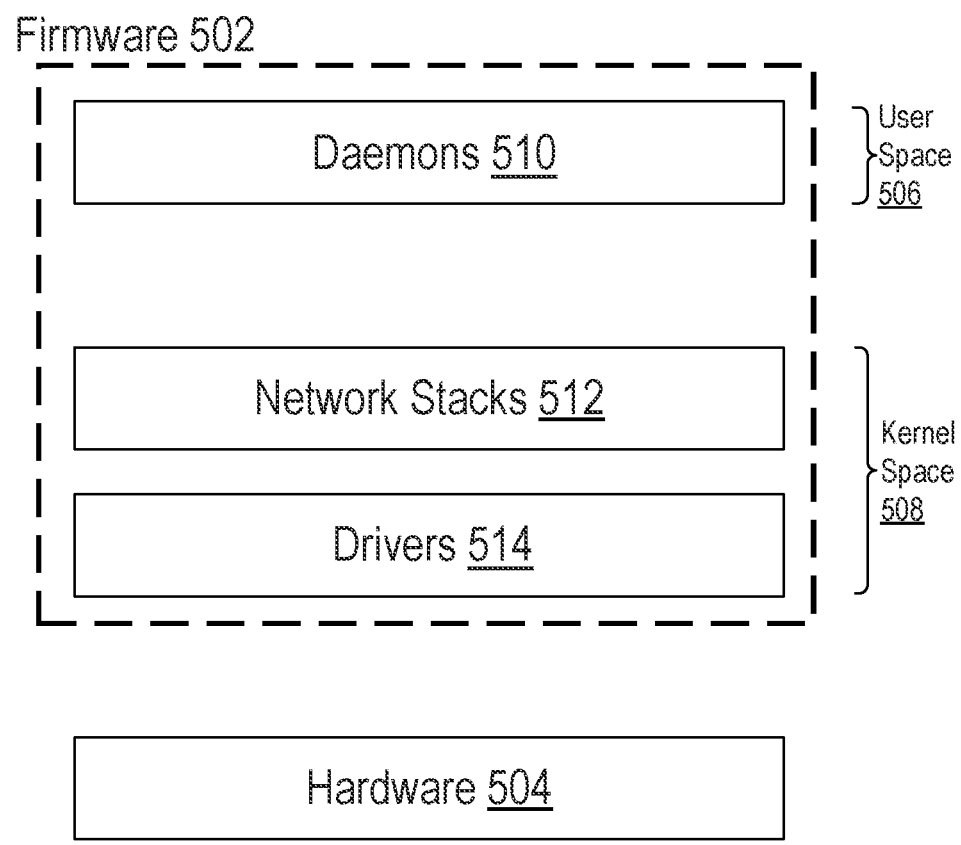
FIG. 5 illustrates an example framework for a network access device in accordance with one or more embodiments.

FIG. 5 illustrates an example framework for a network access device in accordance with one or more embodiments. The network access device includes firmware 502 and hardware 504. The firmware 502 controls operation of the hardware 504. In aspects, the firmware 502 implements low-level control of the hardware for higher-level applications. The firmware 502 includes a user space 506 and a kernel space 508. The kernel space 508 executes privileged, low-level processes that utilize device resources. The user space 506 performs operations to interact with the device kernel. For example, the user space 506 is used to request the kernel to allocate device resources for processes. In aspects, a user space process is unable to access other processes, which can protect the system from faulty or malicious software.

The user space 506 initializes processes based on higher-level applications. The processes are sent to the kernel to allocate device resources to the process. A process from the user space 506 is split into threads which are sent to the kernel for execution. In aspects, multiple processes request resources from the kernel at a same time. The threads are scheduled to arbitrate between multiple processes which may request device resources at the same time.

The user space 506 includes daemons 510, which execute in the background (e.g., without user intervention) to handle service requests (e.g., from higher-level applications). The daemons 510 are started automatically by the boot sequence. The daemons 510 perform maintenance tasks or provide services to other processes. In aspects, the resources are allocated based on priority (e.g., based on time or importance). As a result, there may be delays between initiating processes in the user space 506 and executing those processes using the hardware 504. Thus, processes initialized by higher-level applications can have higher overhead than processes initiated at the kernel.

In embodiments, the kernel space 508 accesses device resources and controls operation of the hardware 504. The kernel space 508 allocates device resources to particular processes. The processes can be split into threads, which are executed in a particular order. In embodiments, the kernel space 508 determines the order in which threads execute based on priority (e.g., based on time or importance). The kernel space 508 further executes processes in accordance with specific protocols. While the kernel space 508 still performs scheduling, initializing processes at the kernel space 508 avoids overhead in sending processes to the kernel.

The kernel space 508 includes network stacks 512 that implement processes in accordance with different protocols. Each protocol is used for a specific purpose. The network stacks 512 are implemented in a hierarchical framework. The lowest protocol implements low-level interaction with the hardware 504, while higher-level protocols add additional capabilities. In general, user applications interacts with higher-level protocols, and the processes can be passed down to the lower-level protocols.

The kernel space 508 includes device drivers 514, which execute kernel-level functions to control operation of the hardware 504. The drivers 514 include a collection of routines and data structures that can be accessed by other kernel modules. The device drivers 514 implement a loadable kernel module that manages data transfers between a device and the operating system. The drivers 514 are loaded at boot time or by request and unloaded by request. The drivers 514 execute specific processes without intervention or control by higher-level layers. In this way, operations (e.g., network traffic generation, network traffic transmission/reception, transmission statistic collection, throughput estimation) are offloaded to the drivers 514 to control operation of the hardware 504 without intervention from higher-layer applications. In aspects, network traffic generated through a kernel-level tool are provided directly to the drivers 514 for transmission/reception.

The hardware 504 includes hardware used to transmit or receive network traffic. For example, the hardware 504 includes a processor that can execute instructions stored in a computer-readable storage medium. The hardware 504 is used to communicate data through Ethernet, Wi-Fi, Bluetooth, or any other communication technique. Embodiments of the network access device, including implementations of hardware or firmware, are further described with respect to FIG. 6.

Figure 6:
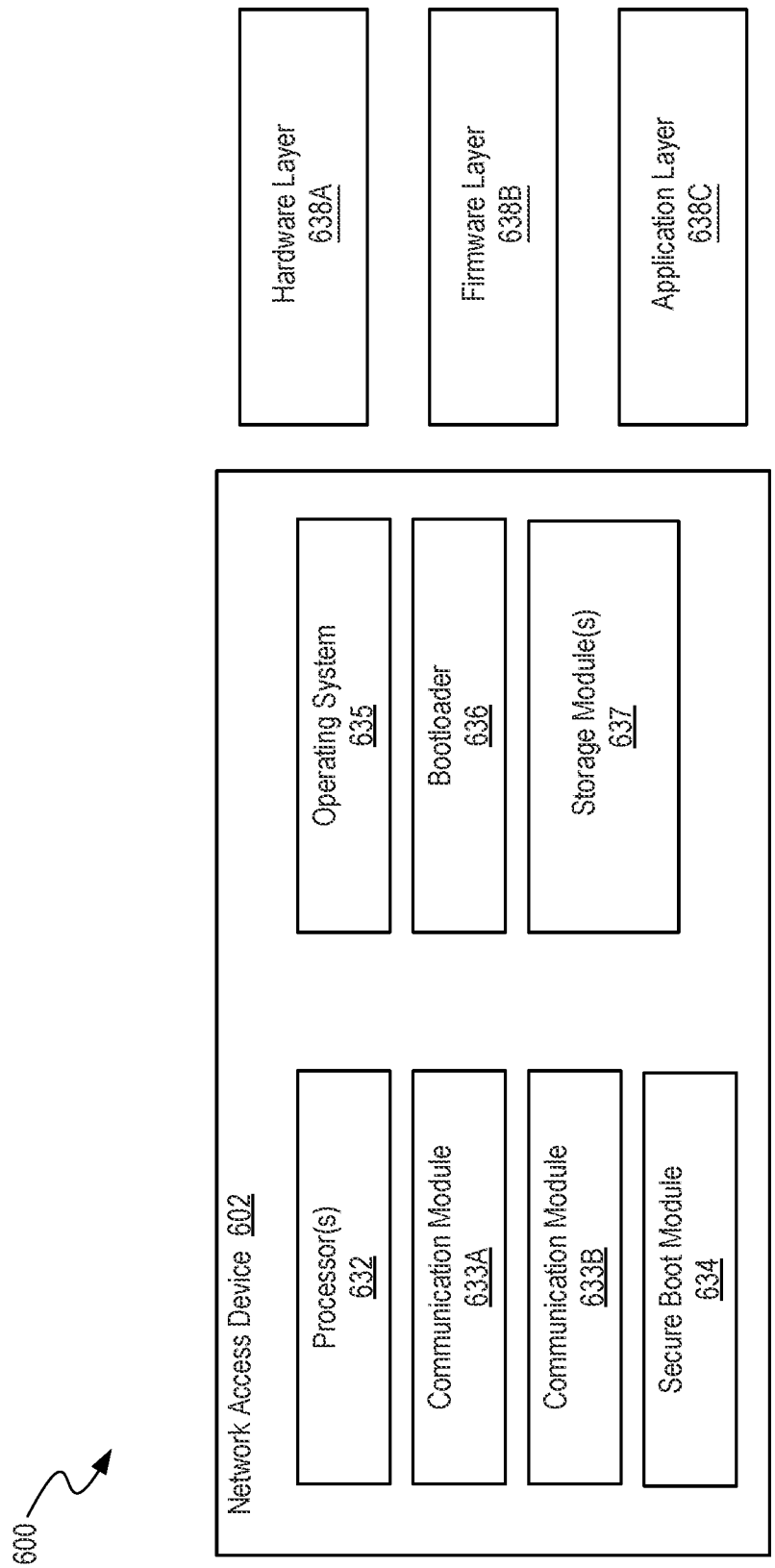
FIG. 6 illustrates an example network access device in accordance with one or more embodiments.

FIG. 6 illustrates an example network access device in accordance with one or more embodiments. In embodiments, the network access device 602 facilitates connections between electronic devices (e.g., personal computers, mobile phones, wearable items) and a network. The network access device 602 may be, for example, a router, modem, switch, access point, mesh nodes, etc. Some embodiments are described in the context of a router for purpose of illustration only. Those skilled in the art will recognize that similar technology may be used in conjunction with other types of network access devices. Network access device 602 is implemented using the components of the example computer system 600 illustrated and described in more detail with reference to FIG. 6. Likewise, embodiments of network access device 602 include different or additional components or are connected in different ways.

Network access device 602 include one or more processors 632, communication module(s) 633A-B, a secure boot module 634, an operating system 635, a bootloader 636, and one or more storage modules 637.

Processor(s) 632 execute instructions stored in the storage module(s) 637, which, in embodiments, includes any device or mechanism capable of storing information. In some embodiments, a single storage module includes multiple computer programs for performing different operations (e.g., establishing a communication channel with an electronic device, examining data packets within received traffic), while in other embodiments, each computer program is hosted within a separate storage module.

In some embodiments, the network access device 602 may include at least three layers: a hardware layer 638A, a firmware layer 638B, and an application layer 638C. The hardware layer 638A of a network access device 602 may include the physical chipset-level of the network access device. A boot certificate (also referred to as a "birth certificate") may be "sewn" or "burned" into the hardware layer 638A of the network access device 602. For example, the boot certificate may be burned in a chipset-level location within the hardware layer 638A of the network access device. The boot certificate may include registration information that can be embedded within a secure, chipset-level location known only to the manufacturer.

The boot certificate may include information indicative of identifying the network access device 602. The boot certificate may include a serial number, license key, or other identifying information to identify the network access device 602. The boot certificate may verify physical ownership of the network access device 602, as the boot certificate may be physically stored on the hardware layer 638A of the network access device 602.

The hardware layer 638A of the network access device 602 may include a hash key programmed in one-time programmable (OTP) memory. OTP memory may include non-volatile memory that permits data to be written to memory only once. OTP memory may be utilized during manufacturing of the network access device 602 to upload firmware onto the network access device 602. In some embodiments, if the network access device 602 receives firmware, the OTP memory can upload the firmware to the network access device 602. The OTP memory may include the boot certificate. When the network access device 602 leaves a manufacturing facility, the network access device 602 may include a birth certificate and firmware signed with an intermediate digital certificate.

The network access device 602 may include a firmware layer 638B. The firmware layer 638B may require that any firmware installed onto the network access device 602 be digitally signed to prevent any unauthorized entity from accessing and/or installing firmware onto the network access device.

In some embodiments, the network-accessible server system may periodically transmit updated firmware to the network access device 602. Each time updated firmware is transmitted from the network-accessible server system, the network-accessible server system may digitally sign the updated firmware.

The network access device 602 may include an application layer 638C. The application layer 638C may facilitate interaction with a mobile application to modify the settings of the network access device 602. The application layer 638C may include applications that can be read by, for example, a secure boot module 634. These applications can be developed by the manufacturer or a third party. While a mobile application may connect to the application layer 638C of the network access device 602, the application layer may be prevented from being activated until after the network access device 602 verifies that the application has been signed by the manufacturer. The application layer 638C may not connect to the mobile application until a digital certificate is distributed to the network access device 602.

The network access device 602 may include one or more communication modules 633A-B. Here, for example, the network access device 602 includes multiple communication modules 633A, 633B, which may be designed to communicate in accordance with different communication protocols. However, the network access device 602 could include a single communication module capable of communicating in accordance with multiple communication protocols or communicating along separate threads and/or frequency bands in accordance with a single communication protocol. The communication module(s) 633A-B can facilitate communication between various components of the network access device 602. Generally, the communication module(s) 633A-B communicate with other electronic device(s) by transmitting data wirelessly via an antenna. In some embodiments, the network access device 602 includes multiple antennas designed for communicating in accordance with various communication protocols described herein.

A first communication module 633A may route and/or forward network traffic between one or more electronic devices and a network, such as the Internet. For example, the communication module 633A may facilitate electronic communication with a mobile phone, tablet computer, or wearable item seeking to establish a connection with a network to which the network access device 602 is connected.

A second communication module 633B may route and/or forward local data packets between a computer program executing on an electronic device and a manufacturer platform executing on a network-accessible server system. The local data packets received at the network access device 602 may include provisioning and settings customization of the network access device 602. In some embodiments, the second communication module 633B may utilize a short-range wireless communication protocol to communicate with the computer program.

The secure boot module 634 can be configured to, upon start-up, verify that firmware residing on the network access device 602 has been digitally signed. For example, the secure boot module 634 may examine the signature of the bootloader 636 to verify that it hasn't been modified. If the bootloader 636 is fully intact, the secure boot module 634 may permit the bootloader 636 to initiate the operating system 635.

Upon initialization of an acquired device (e.g., a network access device), the network access device may be onboarded onto a network. A manufacturer-authorized device may onboard and provision the network access device. An example of a manufacturer-authorized device is a computing device that is authorized by the manufacturer to securely provision and boot a device, such as a network-accessible server system. A network access device, such as a router, may initially connect to the manufacturer-authorized device during the start-up or initialization process (e.g., upon booting). When the network access device connects to the manufacturer-authorized device, the manufacturer-authorized device may authenticate the network access device. Authenticating the network access device may include inspecting the network access device to verify the identity of the network access device.

Generally, network access devices, during initialization, may be vulnerable to unauthorized access. A remote entity may attempt to access the network access device or transmit malware to the network access device upon boot. To address such vulnerabilities, network access devices may include authorization by a manufacturer-authorized device before the network access device is permitted to connect to a network.

Additionally, in many areas where a network access device is provisioned, there may be insufficient coverage to allow for the electronic device to communicate with a cellular node over a wireless cellular network. If the electronic device is unable to connect to a wireless cellular network and transmit a request to the manufacturer-authorized device, the secure boot process initiated by the network access device may be unsuccessful.

To address the inconsistent coverage of an electronic device to connect to a wireless network, a network-accessible server system may establish a geographical location of the network access device and a geographical location of an electronic device and determine that the geographical location of the network access device and the geographical location of the electronic device are within a predetermined proximity of one another. In some embodiments, establishing the geographical location of the electronic device includes examining an IP address of the network access device. In other embodiments, it is determined that the network access device and the electronic device are communicatively coupled via a short-range wireless communication protocol, such as Bluetooth, for example. This allows the network-accessible server system to determine that the electronic device is within a certain proximity of the network access device due to the connectivity range limits on such a short-range wireless communication protocol.

Wireless Network

Figure 7:
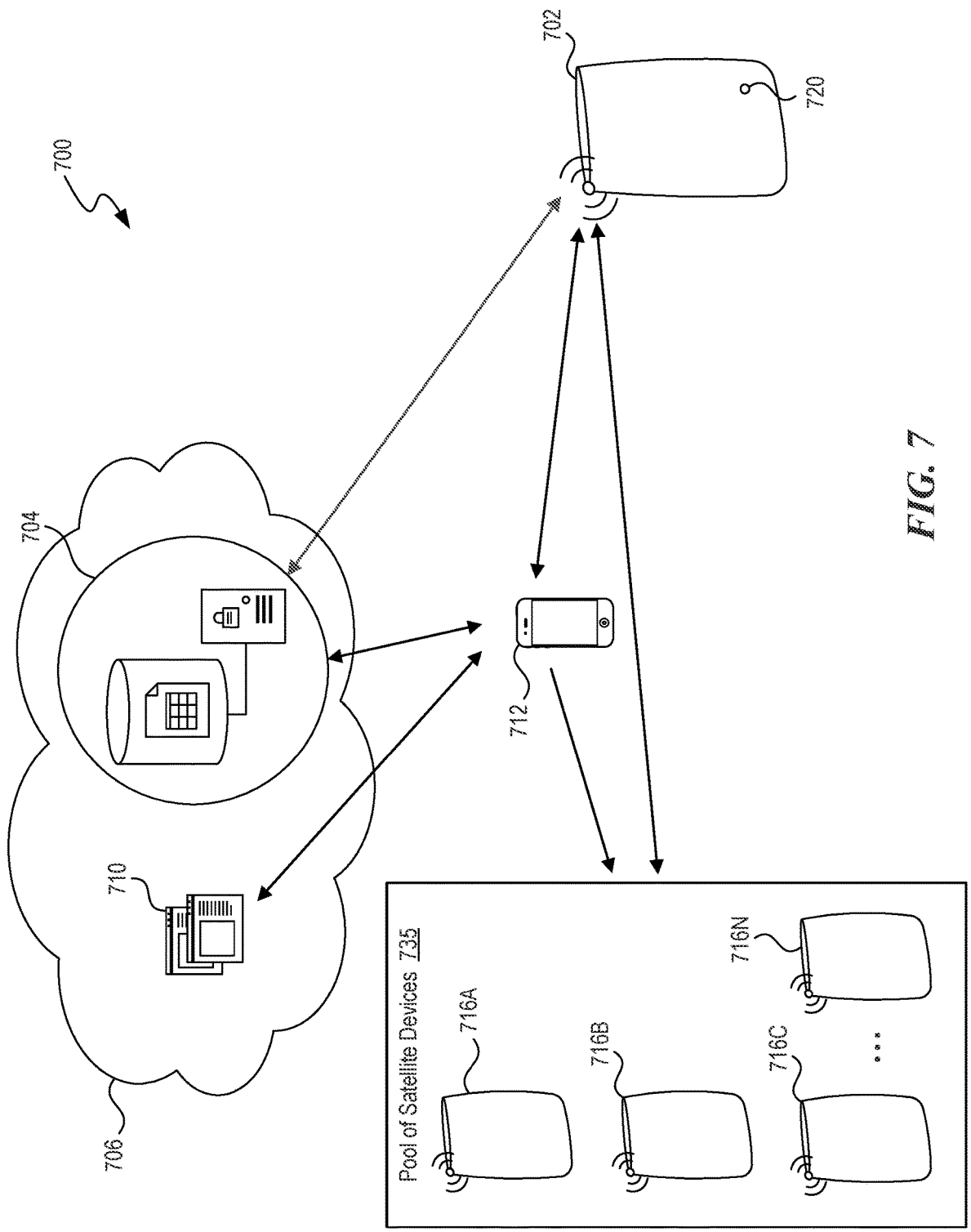
FIG. 7 illustrates an example network environment in accordance with one or more embodiments.

FIG. 7 illustrates an example network environment, in accordance with one or more embodiments. The network environment 700 includes one or more satellite networking devices (or simply "satellite devices"), consistent with various embodiments. In accordance with embodiments herein, a satellite device is a network-enabled device that is configured to forward network data between the network access device and local electronic devices connected to the satellite device. In an embodiment, the satellite device may be configured to direct network data to the network access device, where the network access device transmits/receives network data from the network, such as the Internet. Typically, the satellite device is used to improve the existing abilities of the network access device by extending the range or improving the signal strength of a network and so on.

In an embodiment, the environment 700 may include a network access device 702, a computer program 710 executing on an electronic device 712 (e.g., wireless device), a network-accessible server system 704, and at least one satellite device (e.g., 716A-N from a pool of satellite devices 735). It should be appreciated that a typical networked environment (e.g., house, building) may have one or two satellite devices. However, an embodiment contemplates many satellite devices, such as N number of devices, as depicted by Nth satellite device 716N. In an embodiment, network-accessible server system 704 includes a management platform (not shown), which is communicably connected to any of, all of, or any combination of computer program 710, an application on network access device 702 (not shown), and an application on at least one satellite device 716A-N. Thus, any reference herein to network-accessible server system 704 may include the management platform.

In some embodiments, a satellite device, such as first satellite device 716A, may be configured to facilitate communication between electronic devices (e.g., personal computers, mobile phones, wearable items) and a network. For example, in an embodiment, first satellite device 716A is configured to communicate with computer program 710 on electronic device 712. First satellite device 716A may be configured and used to improve the existing abilities of the network access device 702 by extending the range or improving the signal strength of the network.

Any satellite device 716A-N may communicatively couple to the network access device 702, and the network access device 702 may direct network data transmitted by such satellite devices. Satellite device(s) 716A-N may communicate with the network access device 702 via a suitable wireless communication protocol as described herein. Also, in an embodiment, any satellite device in the pool of satellite devices 735 may communicatively couple to a different satellite device in the pool of satellite devices 735 for the purposes of communicating with the network access device 702. For example, first satellite device 716A and second satellite device 716B may be configured in a series topology, and so on. In this example, second satellite device 716B sends data that is intended for network access device 702 directly to first satellite device 716A first, and first satellite device 716A forwards the data on to network access device 702.

The network access device 702 may connect to one or more satellite device(s) 716A-N. Each satellite device (e.g., first satellite device 716A) communicably connected to the network access device 702 may be identifiable by the network access device 702. The network access device 702 may receive identification information from the satellite device (e.g., first satellite device 716A) upon being communicably connected to the satellite device. Identification information may include a boot certificate of the satellite device (e.g., first satellite device 716A), where the boot certificate is stored in the satellite device, for example. The identification may include permission to access the boot certificate-related information in storage in the manufacturer's cloud system. Identification information may include a satellite device serial number or IP address, for example.

One or more satellite devices may connect to the network access device 702 via a tree network topology. In a tree topology, each satellite device is configured to transmit network data to each of the other satellite devices and to the network access device. The network access device 702 is configured to transmit the network data to the network 706. First satellite device 716A, second satellite device 716B, and third satellite device 716C are each communicably connected to network access device 702. In addition, first satellite device 716A is communicably connected to second satellite device 716B via wireless communication and to the third satellite device 716C via wireless communication. Second satellite device 716B also is communicably connected to third satellite device 716C via wireless communication. Network access device 702 may be configured to further transmit the network data to the network (not shown). Multiple satellite devices may be interconnected, where each satellite device forwards network data through the tree network to the network access device 702. Multiple satellite devices may be interconnected across a tree network environment, such as a building, for example. The tree network may allow for multiple satellite devices to be interconnected, where the range of the wireless network may be extended due to the interconnectivity of multiple satellite devices located across the network environment.

One or more satellite devices may connect to the network access device 702 via a hub-and-spoke or star topology. In a hub-and-spoke topology, each satellite device is configured to transmit network data to the network access device, and the network access device is configured to transmit the network data to the network. First satellite device 716A is communicably connected to network access device 702 via a first wireless communication. Second satellite device 716B is communicably connected to network access device 702 via a second wireless communication. Third satellite device 716C is communicably connected to network access device

702 via a third wireless communication. Network access device 702 is configured to further transmit the network data to the network (not shown).

An electronic device 712 may communicatively couple to one or more satellite devices 716A-N. For example, the electronic device 712 may connect to the first satellite device 716A or the second satellite device 716B. In an embodiment, the electronic device may communicably connect to the satellite devices of the pool of satellite devices via a separate connection with each satellite device. For example, electronic device 712 may connect to the first satellite device 716A and connect to the second satellite device 716B via separate connections (not shown) over a network. The first satellite device 716A may receive network data from the electronic device 712 and direct the network data to the network access device 702. In a tree network architecture/topology, one satellite device may receive network data from another satellite device that was originally from an electronic device over a network and may forward the network data to the network access device. For instance, the first satellite device 716A may receive network data from second satellite device 716B, which originally received the network data from electronic device 712, and the first satellite device 716A may forward the network data to the network access device 702. In an embodiment, electronic device 712 may also communicably connect to the network-accessible server system 704 via the network. A network can represent communication using networking protocol or it can represent cellular protocols. A network can represent communication using both types of protocols. One skilled in the art can understand which protocol is being used, depending on the context. Further, electronic device 712 and network access device 702 may be communicably connected via a network. In an embodiment, network-accessible server system 704 is communicably connected to network access device 702.

An embodiment of a high-level process for onboarding or booting a satellite device can be understood with reference to FIG. 7. It should be appreciated that the particulars are for illustrative purposes and are not meant to be limiting. For purposes of discussion, it is assumed that second satellite device 716B has not yet been provisioned, but a user desires to do so. Second satellite device 716B becomes alive, for example, by the user turning on the device. It should further be appreciated that second satellite device 716B does not connect to any port of network access device 702 and, therefore, does not have or obtain Internet connectivity of its own.

Upon activation, second satellite device 716B electronically communicates with electronic device 720, which is within a predetermined range or proximity, by way of short-range wireless communication protocol, such as Bluetooth Low Energy (BLE), for example. More specifically, second satellite device 716B is configured to communicate with computer program 710, and computer program 710 is also configured to receive and process communication from second satellite device 716B. In an embodiment, second satellite device 716B was previously provisioned, e.g., by the manufacturer, with a unique certificate. That is, a satellite boot certificate (also referred to as a satellite "birth certificate") may have been embedded, e.g., sewn or burned, into the hardware layer of second satellite device 716B. The satellite boot certificate may include registration information that can be embedded within a secure, chipset-level location known only to the manufacturer. Thus, in response to being activated, second satellite device 716B transmits its satellite boot certificate to computer program 710. The registration information of second satellite device 716B can be stored on any of the devices in the environment, such as network-accessible server system 704, electronic device 720, or network access device 702. It should be appreciated that upon activation, second satellite device 716B may also send signals to network access device 702, however, network access device 702 can be configured to ignore such signals until certain conditions are met as described below.

Upon receipt of the satellite boot certificate, computer program 710 transmits the satellite birth certificate and appropriate credentials of computer program 710 to network-accessible server system 704. In a different embodiment, upon a type of notification, computer program 710 transmits data identifying that the user is in possession of second satellite device 716B to network-accessible server system 704. For example, a user can take a photograph of the serial number of the second satellite device 716B and transmit the photograph along with the appropriate credentials of computer program 710 to network-accessible server system 704. In another embodiment, computer program 710 accesses a birth certificate of second satellite device 716B stored on electronic device 720 or network access device 702 and transmits the accessed birth certificate along with the appropriate credentials of computer program 710 to network-accessible server system 704.

Upon receipt of the satellite boot certificate or data indicating that the user is in possession of second satellite device 716B and the credentials of computer program 710, network-accessible server system 704 verifies, using the received credentials, that computer program 710 is a valid application in its system. Also, network-accessible server system 704 verifies that the satellite boot certificate, or data indicating that the user is in possession of second satellite device 716B, is legitimate. For instance, one or more verified satellite boot certificates may be listed on a satellite boot certificate registry on or associated with network-accessible server system 704. Network-accessible server system 704 compares the received satellite boot certificate to a satellite boot certificate stored in the satellite boot certificate registry. Upon a match, network-accessible server system 704 knows that the received satellite boot certificate is valid. As an example, and for illustrative purposes, a satellite boot certificate can contain or be associated with a serial number of second satellite device 716B. In another embodiment, network-accessible server system 704 compares the received data indicating the user is in possession of second satellite device 716B with previously stored data. Upon a match, network-accessible server system 704 knows that the received data indicating the user is in possession of second satellite device 716B is valid. Examples of credentials of computer program 710 may include, but are not limited to, username and password or any identifier agreed upon between computer program 710 and network-accessible server system 704. It should be appreciated that confirming that the user of the computer program 710 is valid and that the user is in possession of the satellite device may be performed in a particular sequence or in parallel.

Upon verifying that the user of computer program 710 is valid and that the satellite boot certificate or possession of second satellite device 716B is confirmed, network-accessible server system 704 associates second satellite device 716B with computer program 710 and/or network access device 702 for further communication.

In an embodiment, upon associating computer program 710 and second satellite device 716B, network-accessible server system 704 pushes a digital certificate intended for second satellite device 716B through or via network access device 702. In another embodiment, upon associating computer program 710 and second satellite device 716B, network-accessible server system 704 grants permission for second satellite device 716B to have access to network access device 702. For example, network-accessible server system 704 may send a notification to network access device 702 to accept any requests by second satellite device 716B for access to the network. In another embodiment, upon receiving a request from second satellite device 716B to access the network, network access device 702 may transmit a verification request to network-accessible server system 704 or to computer program 710 intended for network-accessible server system 704. Upon receiving such verification request, network-accessible server system 704 can check whether second satellite device 716B is an associated device. When second satellite device 716B is an associated device, network-accessible server system 704 can send a notification indicating that permission to access the network is granted. When second satellite device 716B is not an associated device, network-accessible server system 704 can send a notification indicating that permission to access the network is denied.

A specialized public key infrastructure (PKI) accessible to the network-accessible server system 704 can be configured to facilitate the distribution of online certificates, each of which may include a public encryption key, to the network access device(s), mobile application(s), and/or satellite device(s) associated with a local network. The network-accessible server system may communicate with the PKI via application programming interfaces (APIs), bulk data interfaces, etc. Generally, the network-accessible server system 704 will request a separate certificate for each mobile application and satellite device. For example, if the network access device is set up to be connected to a single mobile application and four satellite devices distributed throughout an environment (e.g., a home), then the network-accessible server system 704 may request five certificates and distribute a unique certificate to the mobile application and satellite devices.

Intermediate digital certificates may be distributed by one of the network-accessible server system 704. Intermediate digital certificates may be generated for firmware verification. The intermediate digital certificates may include information indicative of identifying the network-accessible server system 704. The network-accessible server system 704 may digitally sign the firmware by providing information identifying the network-accessible server system 704 on the intermediate digital certificate. The network access device may receive the intermediate digital certificate and determine that the firmware has been digitally signed and is verified.

Upon receiving the digital certificate, second satellite device 716B may have access to the Internet by using network access device 702. In an embodiment, if network access device 702 is not within communication range of second satellite device 716B, second satellite device 716B may communicate with network access device 702 by using a satellite device, for example as in a daisy-chain configuration or tree configuration. For example, in a user's household, the user's router (user's network access device) may be physically located in the basement floor and the user's satellite device is in the upstairs kitchen. Thus, as the user walks up the stairs from the basement to one of the upstairs rooms, the user's cell phone access to the Internet may switch from being communicably connected directly to the user's router to being communicably connected directly to the user's satellite device, which is communicably connected directly to the user's router. To continue with the example, as the user walks downstairs, the user's cell phone access to the Internet may switch again from being communicably connected directly to the user's satellite device to being communicably connected directly to the user's router.

An automatic firmware update process and system is provided according to one or more embodiments. Providing for automatic updates of firmware can help to ensure an improved secure networking environment. For instance, relying on a customer to update his or her satellite device might result in the customer's satellite device lacking a security upgrade. In this and similar scenarios, the satellite device might be vulnerable to a malware attack because the satellite device lacks an antidote to the malware that was made available in a later version of the firmware.

In an embodiment and any of the satellite devices 716A-N, network access device 702, network-accessible server system 704, and computer program 710 may be configured to determine whether any satellite device (e.g., second satellite device 716B) is configured with the most up-to-date or required firmware. It should be appreciated that while one satellite (e.g., second satellite device 716B) may be used as an example in the following discussion, it is for illustrative purposes and is not meant to be limiting. In the example, the satellite boot certificate or other metadata associated with the satellite boot certificate can indicate an initial firmware version, which can be used by any of the above-cited entities to determine whether the firmware presently loaded on second satellite device 716B matches the presently required firmware. For instance, a user could have purchased the satellite device months before installing the satellite device. Therefore, it could be possible that a newer version of the firmware became available during the time after the purchase and before installation. Thus, in this example, at installation, the firmware associated with the satellite boot certificate is not up-to-date.

In an embodiment, network-accessible server system 704 pushes the required firmware intended for second satellite device 716B by using network access device 702. In an embodiment, the firmware that gets pushed onto any satellite device is digitally signed so that any configured entity can verify whether the firmware is valid and not malware imposing as legitimate firmware. In another embodiment, network access device 702 may have the required firmware and may push such required firmware intended for second satellite device 716B exclusive of the network access device 702. The embodiments disclosed herein ensure that a secure configuration is deployed to second satellite device 716B once second satellite device 716B has been brought online.

An embodiment for monitoring firmware updates includes a satellite device being configured to identify its current firmware status and to send such status to the network access device or to the network-accessible server system. In an embodiment, the network access device determines whether the firmware status is up-to-date and, when not, either pushes a firmware update in its storage to the satellite device or transmits a request to the network-accessible server system for the most up-to-date firmware for the satellite device. In an embodiment, the network-accessible server system determines whether the firmware status is up-to-date and, when it is not, pushes a firmware update in its storage to the satellite device.

In an embodiment for monitoring firmware updates in a tree network architecture of two or more satellite devices, a first satellite can ping the other satellites in the tree network for the purposes of receiving their respective firmware versions. The first satellite is configured to compare its firmware version with received firmware versions. If the first satellite device concludes that their respective firmware versions match, then the first satellite device is configured to conclude that no firmware update is required. The first satellite device may send an update notification intended for the network-accessible server system. The first satellite device may be further configured to conclude that its firmware version is different from any of the other received firmware versions. The first satellite device, upon detecting that its firmware version does not match all other firmware versions, may be configured to report to the network-accessible server system that there is a discrepancy in firmware versions. In an embodiment, the network-accessible server system pushes the latest firmware version to the first satellite device. In another embodiment, the first satellite device, upon detecting that its firmware version does not match all other firmware versions, may be configured to report to the network access device that there is a discrepancy in firmware versions. In an embodiment, the network access device pushes the latest firmware version to the first satellite device. In an embodiment, upon receiving a notification from the first satellite device that there is a discrepancy of firmware versions on the network, the network access device may transmit a firmware update request to the network-accessible server system for firmware updates for the first satellite device and, optionally, for the other satellite devices on the network.

In an embodiment for monitoring firmware updates, each of the satellite devices on the network can, upon request or periodically, transmit their respective firmware statuses to the network access device. The network access device is configured to decide whether any firmware upgrades are required for any of the satellite devices on the network. In an embodiment, when an upgrade is required, the network access device can make a request for such upgrade to the network-accessible server system. In an embodiment, the network-accessible server system can automatically push a firmware upgrade for any satellite device to the network access device. A network access device can be configured to, upon receipt of the automatically pushed firmware upgrade from the network-accessible server system, automatically decide which satellite needs the upgrade and automatically push such upgrade to the satellite device.

It should be appreciated that network-accessible server system 704 may push other configurations intended for second satellite device 716B via network access device 702. For example, such configurations enable second satellite device 716B to be fully operative on network access device 702. As another example, using electronic device 720 and computer program 7210 a user can configure second satellite device 716B by setting suitable parameters through a user interface on computer program 710 that connects with network-accessible server system 704. Then, network-accessible server system 704 pushes the entered configurations intended for second satellite device 716B via network access device 702.

Upon obtaining Internet connectivity, second satellite device 716B initiates self-registration in network-accessible server system 704. Such an arrangement allows network access device 702 and any number of satellites to be connected to network-accessible server system 704, as well as the computer program 710, regardless of whether electronic device 720 resides within the network associated with network access device 702. When electronic device 720 resides outside of such network, changes requested through computer program 710 can be carried out by network-accessible server system 704. In some embodiments, each of a plurality of satellites within the network is connected to network access device 702 in accordance with a hub-and-spoke approach (e.g., each satellite is connected directly to network access device 702). In other embodiments, the satellites within the network are permitted to form a tree network architecture. Thus, each satellite need not necessarily be directly connected to the network access device. For example, as shown in FIG. 7, second satellite device 716B can be connected to first satellite device 740, which is connected to network access device 702.

By installing a separate digital certificate on each of network access device 702, computer program 710, and satellite device(s) (e.g., first satellite device 740 and second satellite device 716B), network-accessible server system 704 can ensure that these objects are tied together. Consequently, for an unauthorized entity to gain access to the network, the unauthorized entity would need to acquire the digital certificate in addition to the credentials (e.g., username and password) used to log into computer program 710.

As described above, a specialized PKI accessible to the network-accessible server system (e.g., network-accessible server system 704) can be configured to facilitate the distribution of digital certificates, each of which may include a public encryption key, to the network access device(s) (e.g., network access device 702), mobile application(s) (e.g., computer program 710), and satellite(s) (e.g., a first satellite device and second satellite device) associated with a network. The network-accessible server system may communicate with the PKI via APIs, bulk data interfaces, etc. Generally, the network-accessible server system will request a separate certificate for each mobile application and satellite. For example, if the network access device is set up to be connected to a single mobile application and four satellites distributed throughout an environment (e.g., a home), then the network-accessible server system may request five certificates and distribute a unique certificate to each of the mobile applications and satellites.

Intermediate digital certificates may be distributed by one of the network-accessible server system 704 or the PKI module 734. Intermediate digital certificates may be generated for firmware verification. The intermediate digital certificates may include information indicative of identifying the network-accessible server system 704. The network-accessible server system 704 may digitally sign the firmware by providing information identifying the network-accessible server system 704 on the intermediate digital certificate. The network access device 702 may receive the intermediate digital certificate and determine that firmware has been digitally signed and is verified.

One benefit of the tree architecture described herein is that security risk can be lessened even when the network access device and the satellite(s) are produced by different entities. For example, an individual may have a router manufactured by Comcast® and an Orbi® Wi-Fi System manufactured by NETGEAR® deployed within her home. In such instances, the individual can log into a mobile application executing on her mobile phone, claim the network access device, and configure each satellite. In some embodiments, the network access device is configured to communicate with the satellite(s). For instance, in such embodiments, traffic received at either level (e.g., by the network access device or the satellite devices) can be examined for threats. In other embodiments, the satellite(s) operate independent from the network access device. In such embodiments, only traffic received by the satellite(s) may be examined for threats.

According to embodiments herein, each time a new electronic device (e.g., a new satellite device or a new mobile device) comes onto the network, the satellite device or the network access device to which the new electronic device connects can transmit a notification to the associated mobile application. The notification may prompt the user to specify whether network access should be permitted. While this type of multifactor approval process requires an express indication of approval from a network administrator (e.g., the user responsible for deploying the network access device and/or satellite(s)), it can significantly lessen the security risk of unauthorized access. Administrator authorization may be required even if the party attempting to access the network has acquired the necessary credentials (e.g., the password).

In some embodiments and as described above, each network access device and/or satellite within a network environment is configured to automatically update its firmware. Thus, in accordance with embodiments herein, when these objects are properly connected (e.g., via a tree architecture), the firmware across all of the devices will be consistent. Such action ensures that a hacker cannot gain unauthorized access via a security flaw in an older firmware version that has not yet been manually updated by the network administrator.

Machine Learning System

FIG. 8 illustrates an example ML system, in accordance with one or more embodiments. The ML system 800 is implemented using components of the example computer system 900 illustrated and described in more detail with reference to FIG. 9. For example, the ML system 800 can be implemented on the computer system 800 using instructions programmed in the non-volatile memory 810 illustrated and described in more detail with reference to FIG. 9. Likewise, embodiments of the ML system 800 can include different and/or additional components or be connected in different ways. The ML system 800 is sometimes referred to as an ML module.

The ML system 800 includes a feature extraction module 808 implemented using components of the example computer system 900 illustrated and described in more detail with reference to FIG. 9. In some embodiments, the feature extraction module 808 extracts a feature vector 812 from input data 804. The feature vector 812 includes features 812A through 812N. The feature extraction module 808 reduces the redundancy in the input data 804, e.g., repetitive data values, to transform the input data 804 into the reduced set of features 812, e.g., features 812A through 812N. The feature vector 812 contains the relevant information from the input data 804, such that events or data value thresholds of interest can be identified by the ML model 816 by using this reduced representation. In some example embodiments, the following dimensionality reduction techniques are used by the feature extraction module 808: independent component analysis, Isomap, kernel principal component analysis (PCA), latent semantic analysis, partial least squares, PCA, multifactor dimensionality reduction, nonlinear dimensionality reduction, multilinear PCA, multilinear subspace learning, semidefinite embedding, autoencoder, and deep feature synthesis.

In alternate embodiments, the ML model 816 performs deep learning (also known as deep structured learning or hierarchical learning) directly on the input data 804 to learn data representations, as opposed to using task-specific algorithms. In deep learning, no explicit feature extraction is performed; the features 812 are implicitly extracted by the ML system 800. For example, the ML model 816 can use a cascade of multiple layers of nonlinear processing units for implicit feature extraction and transformation. Each successive layer uses the output from the previous layer as input.

The ML model 816 can thus learn in supervised (e.g., classification) and/or unsupervised (e.g., pattern analysis) modes. The ML model 816 can learn multiple levels of representations that correspond to different levels of abstraction, wherein the different levels form a hierarchy of concepts. In this manner, the ML model 816 can be configured to differentiate features of interest from background features.

In alternative example embodiments, the ML model 816, e.g., in the form of a convolutional neural network (CNN) generates the output 824, without the need for feature extraction, directly from the input data 204. The output 824 is provided to the video displays 918 illustrated and described in more detail with reference to FIG. 9. The computer device 828 can be a server, laptop, desktop, computer, tablet, smartphone, smart speaker, etc., implemented using components of the example computer system 900 illustrated and described in more detail with reference to FIG. 9. In some embodiments, the steps performed by the ML system 800 are stored on non-volatile memory 910 for execution. In other embodiments, the output 824 is displayed on the computer device 828.

A CNN is a type of feed-forward artificial neural network in which the connectivity pattern between its neurons is inspired by the organization of a visual cortex. Individual cortical neurons respond to stimuli in a restricted area of space known as the receptive field. The receptive fields of different neurons partially overlap such that they tile the visual field. The response of an individual neuron to stimuli within its receptive field can be approximated mathematically by a convolution operation. CNNs are based on biological processes and are variations of multilayer perceptrons designed to use minimal amounts of preprocessing.

The ML model 816 can be a CNN that includes both convolutional layers and max pooling layers. The architecture of the ML model 816 can be "fully convolutional," which means that variable sized sensor data vectors can be fed into it. For all convolutional layers, the ML model 816 can specify a kernel size, a stride of the convolution, and an amount of zero padding applied to the input of that layer. For the pooling layers, the model 816 can specify the kernel size and stride of the pooling.

In some embodiments, the ML system 800 trains the ML model 816, based on the training data 820, to correlate the feature vector 812 to expected outputs in the training data 820. As part of the training of the ML model 816, the ML system 800 forms a training set of features and training labels by identifying a positive training set of features that have been determined to have a desired property in question, and, in some embodiments, forms a negative training set of features that lack the property in question.

The ML system 800 applies ML techniques to train the ML model 816, which, when applied to the feature vector 812, outputs indications of whether the feature vector 812 has an associated desired property or properties, such as a probability that the feature vector 812 has a particular Boolean property, or an estimated value of a scalar property. The ML system 800 can further apply dimensionality reduction (e.g., via linear discriminant analysis (LDA), PCA, or the like) to reduce the amount of data in the feature vector 812 to a smaller, more representative set of data.

The ML system 800 can use supervised ML to train the ML model 816, with feature vectors of the positive training set and the negative training set serving as the inputs. In some embodiments, different ML techniques, such as linear support vector machine (linear SVM), boosting for other algorithms (e.g., AdaBoost), logistic regression, naïve Bayes, memory-based learning, random forests, bagged trees, decision trees, boosted trees, boosted stumps, neural networks, CNNs, etc., are used. In some example embodiments, a validation set 832 is formed of additional features, other than those in the training data 820, which have already been determined to have or to lack the property in question. The ML system 800 applies the trained ML model 816 to the features of the validation set 832 to quantify the accuracy of the ML model 816. Common metrics applied in accuracy measurement include Precision and Recall, where Precision refers to a number of results the ML model 816 correctly predicted out of the total it predicted, and Recall is a number of results the ML model 816 correctly predicted out of the total number of features that had the desired property in question. In some embodiments, the ML system 800 iteratively retrains the ML model 816 until the occurrence of a stopping condition, such as the accuracy measurement indication that the ML model 816 is sufficiently accurate, or a number of training rounds having taken place. The validation set 832 can be generated based on analysis to be performed.

Computing System

Figure 9:
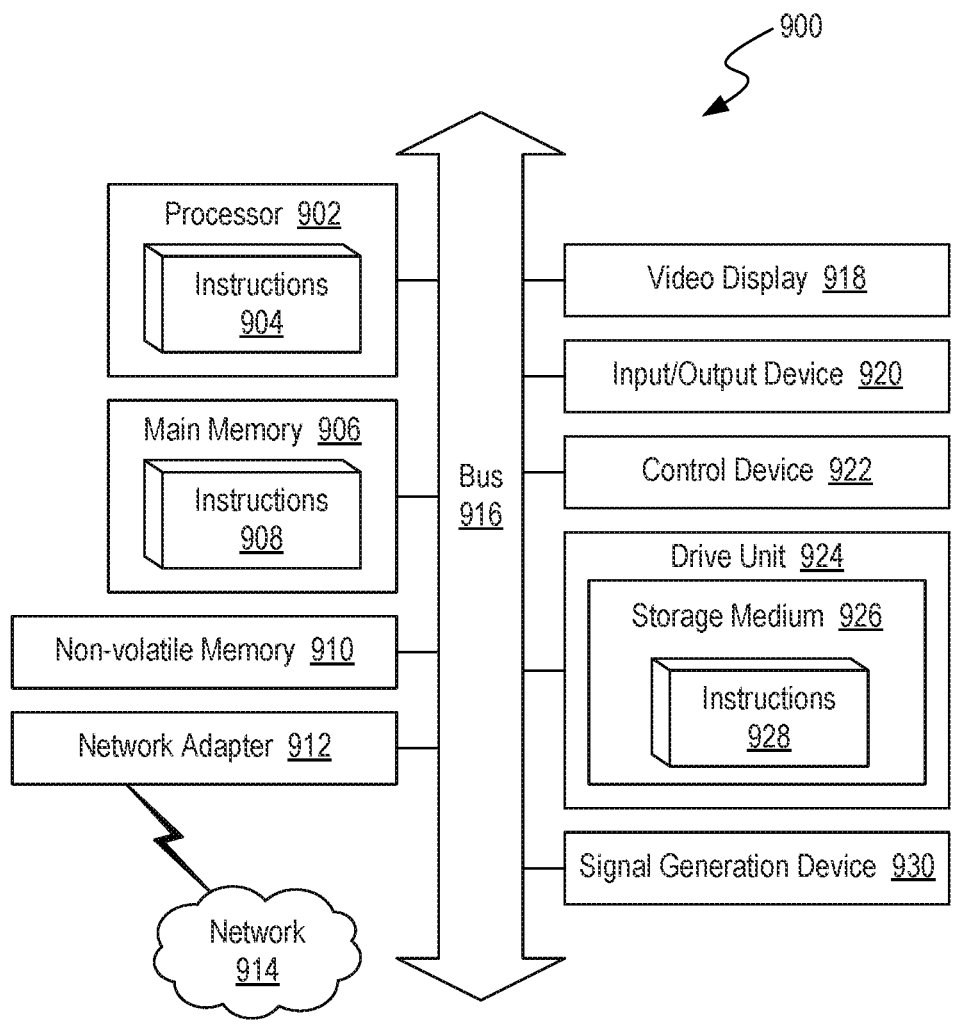
FIG. 9 illustrates an example computer system in accordance with one or more embodiments.

FIG. 9 illustrates an example computer system, in accordance with one or more embodiments. Components of the example computer system 900 can be used to implement the systems illustrated and described in more detail with reference to FIGS. 1-7. In some embodiments, components of the example computer system 900 are used to implement the ML system 800 illustrated and described in more detail with reference to FIG. 8. At least some operations described herein can be implemented on the computer system 900.

The computer system 900 can include one or more central processing units ("processors") 902, main memory 906, non-volatile memory 910, network adapters 912 (e.g., network interface), video displays 918, input/output devices 920, control devices 922 (e.g., keyboard and pointing devices), drive units 924 including a storage medium 926, and a signal generation device 930, all of which are communicatively connected to a bus 916. The bus 916 is illustrated as an abstraction that represents one or more physical buses and/or point-to-point connections that are connected by appropriate bridges, adapters, or controllers. The bus 916, therefore, can include a system bus, a Peripheral Component Interconnect (PCI) bus or PCI-Express bus, a HyperTransport or industry standard architecture (ISA) bus, a small computer system interface (SCSI) bus, a universal serial bus (USB), a IIC (I2C) bus, or an IEEE standard 1394 bus (also referred to as "Firewire").

The computer system 900 can share a similar computer processor architecture as that of a desktop computer, tablet computer, personal digital assistant (PDA), mobile phone, game console, music player, wearable electronic device (e.g., a watch or fitness tracker), network-connected ("smart") device (e.g., a television or home assistant device), virtual/augmented reality systems (e.g., a head-mounted display), or another electronic device capable of executing a set of instructions (sequential or otherwise) that specify action(s) to be taken by the computer system 900.

While the main memory 906, non-volatile memory 910, and storage medium 926 (also called a "machine-readable medium") are shown to be a single medium, the term "machine-readable medium" and "storage medium" should be taken to include a single medium or multiple media (e.g., a centralized/distributed database and/or associated caches and servers) that store one or more sets of instructions 928. The term "machine-readable medium" and "storage medium" shall also be taken to include any medium that is capable of storing, encoding, or carrying a set of instructions for execution by the computer system 900.

In general, the routines executed to implement the embodiments of the disclosure can be implemented as part of an operating system or a specific application, component, program, object, module, or sequence of instructions (collectively referred to as "computer programs"). The computer programs typically include one or more instructions (e.g., instructions 904, 908, 928) set at various times in various memory and storage devices in a computer device. When read and executed by the one or more processors 902, the instruction(s) cause the computer system 900 to perform operations to execute elements involving the various aspects of the disclosure.

Moreover, while embodiments have been described in the context of fully functioning computer devices, those skilled in the art will appreciate that the various embodiments are capable of being distributed as a program product in a variety of forms. The disclosure applies regardless of the particular type of machine or computer-readable media used to actually effect the distribution.

Further examples of machine-readable storage media, machine-readable media, or computer-readable media include recordable-type media such as volatile and non-volatile memory devices 910, floppy and other removable disks, hard disk drives, optical discs (e.g., Compact Disc Read-Only Memory (CD-ROMS), Digital Versatile Discs (DVDs)), and transmission-type media such as digital and analog communication links.

The network adapter 912 enables the computer system 900 to mediate data in a network 914 with an entity that is external to the computer system 900 through any communication protocol supported by the computer system 900 and the external entity. The network adapter 912 can include a network adapter card, a wireless network interface card, a router, an access point, a wireless router, a switch, a multilayer switch, a protocol converter, a gateway, a bridge, a bridge router, a hub, a digital media receiver, and/or a repeater.

The network adapter 912 can include a firewall that governs and/or manages permission to access proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall can additionally manage and/or have access to an access control list that details permissions including the access and operation rights of an object by an individual, a machine, and/or an application and the circumstances under which the permission rights stand.

Methods

Figure 10:
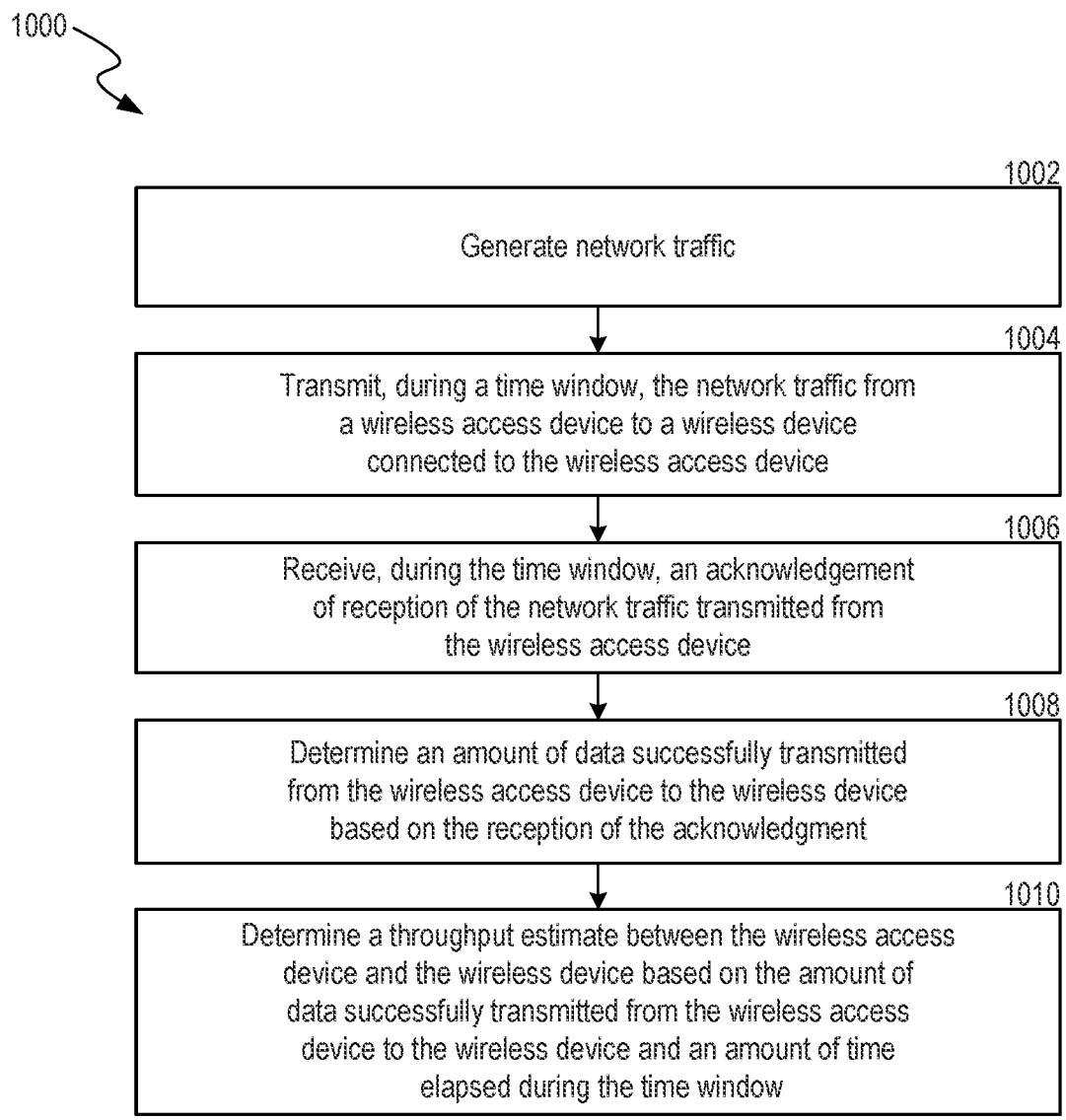
FIG. 10 illustrates an example method for estimating throughput for a wireless device in accordance with one or more embodiments.

FIG. 10 illustrates an example method 1000 for estimating throughput for a wireless device. Although illustrated in a particular configuration, one or more operations of the method 1000 can be omitted, repeated, or reorganized. Additionally, the method 1000 can include additional operations not illustrated in FIG. 10, for example, operations detailed in one or more other methods described herein.

At 1002, a wireless access device generates network traffic. In embodiments, the network traffic is generated by a kernel-level tool that provides the network traffic to a driver that controls transmission/reception of the network traffic. At 1004, the network traffic is transmitted from the wireless access device to a wireless device connected to the wireless access device during a time window. The network traffic is then received at the wireless device, and an acknowledgement is transmitted back to the wireless access device. At 1006, the acknowledgement is received by the network access device during the time window. At 1008, an amount of data successfully transmitted from the wireless access device to the wireless device is determined based on the reception of the acknowledgement. At 1010, a throughput estimate between the wireless access device and the wireless device is determined based on the amount of data successfully transmitted from the wireless access device to the wireless device and an amount of time elapsed during the time window. Accordingly, the method 1000 can be used to estimate the throughput between two nodes.

The techniques introduced here can be implemented by programmable circuitry (e.g., one or more microprocessors), software and/or firmware, special-purpose, hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

The description and drawings herein are illustrative and are not to be construed as limiting. Numerous specific details are described to provide a thorough understanding of the disclosure. However, in certain instances, well-known details are not described in order to avoid obscuring the description. Further, various modifications can be made without deviating from the scope of the embodiments.

The terms used in this specification generally have their ordinary meanings in the art, within the context of the disclosure, and in the specific context where each term is used. Certain terms that are used to describe the disclosure are discussed above or elsewhere in the specification to provide additional guidance to the practitioner regarding the description of the disclosure. For convenience, certain terms can be highlighted, for example, using italics and/or quotation marks. The use of highlighting has no influence on the scope and meaning of a term; the scope and meaning of a term is the same and is in the same context, whether or not it is highlighted. It will be appreciated that the same thing can be said in more than one way. One will recognize that "memory" is one form of a "storage" and that the terms can, on occasion, be used interchangeably.

Consequently, alternative language and synonyms can be used for any one or more of the terms discussed herein, and no special significance is to be placed upon whether or not a term is elaborated or discussed herein. Synonyms for certain terms are provided. A recital of one or more synonyms does not exclude the use of other synonyms. The use of examples anywhere in this specification, including examples of any term discussed herein, is illustrative only and is not intended to further limit the scope and meaning of the disclosure or of any exemplified term. Likewise, the disclosure is not limited to various embodiments given in this specification.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

It is to be understood that the embodiments and variations shown and described herein are merely illustrative of the principles of this invention and that various modifications can be implemented by those skilled in the art.

We claim:

1. A method comprising:
   generating, by a wireless access device, network traffic, wherein the network traffic is generated by a kernel-level tool loaded to a kernel of the wireless access device;
   transmitting, during a time window, the network traffic from the wireless access device to a wireless device connected to the wireless access device;
   receiving, during the time window and from the wireless device, an acknowledgement of reception of the network traffic transmitted from the wireless access device;
   determining an amount of data successfully transmitted from the wireless access device to the wireless device during the time window based on the reception of the acknowledgement; and
   determining a throughput estimate between the wireless access device and the wireless device based on the amount of data successfully transmitted from the wireless access device to the wireless device and an amount of time elapsed during the time window.

2. The method of claim 1, wherein determining the amount of data successfully transmitted from the wireless access device to the wireless device is performed by a Media Access Control (MAC) Layer Management Entity (MLME).

3. The method of claim 1, further comprising:
   determining a constant indicative of an overhead required to transmit the network traffic from a wireless access node to the wireless device,
   wherein the throughput estimate between the wireless access device and the wireless device is further based on the constant.

4. The method of claim 3, further comprising:
   selecting the constant from a set of predetermined constants,
      wherein the set of predetermined constants are determined based on comparisons between multiple throughput estimates and respective expected throughput measurements collected by a network measurement tool.

5. The method of claim 1, wherein the acknowledgement is received in accordance with the IEEE 802.11 standard.

6. The method of claim 1, wherein the network traffic is transmitted from the wireless access device to the wireless device while the wireless device is in a low-power mode.

7. The method of claim 1, further comprising:
   determining a throughput estimate between the wireless device and an additional wireless device; and
   determining a throughput estimate between the wireless access device and the additional wireless device based on the throughput estimate between the wireless access device and the wireless device and the throughput estimate between the wireless device and the additional wireless device.

8. The method of claim 7, further comprising:
receiving, from the wireless device, the throughput estimate between the wireless device and an additional wireless device.

9. A network access device comprising:
one or more processors; and
a non-transitory, computer-readable storage medium storing computer instructions, which, when executed by the one or more processors, cause the network access device to:
  generate network traffic;
  transmit, during a time window, the network traffic to a wireless device connected to the network access device;
  determine, by a Media Access Control Layer Management Entity (MLME) and in accordance with the IEEE 802.11 standard, an amount of data successfully transmitted from the network access device to the wireless device during the time window; and
  determine a throughput estimate between the network access device and the wireless device based on the amount of data successfully transmitted from the network access device to the wireless device and an amount of time elapsed during the time window.

10. The network access device of claim 9, wherein the instructions further cause the network access device to:
  receive, during the time window and from the wireless device, an acknowledgement of reception of the network traffic transmitted from the network access device,
  wherein determining the amount of data successfully transmitted from the network access device to the wireless device during the time window is based on the reception of the acknowledgement.

11. The network access device of claim 9, further comprising:
  a kernel-level tool loaded to a kernel of the network access device,
  wherein the kernel-level tool generates the network traffic.

12. The network access device of claim 9, wherein the instructions further cause the network access device to:
  determine a constant indicative of an overhead required to transmit the network traffic from the network access device to the wireless device,
  wherein the throughput estimate between the network access device and the wireless device is further based on the constant.

13. The network access device of claim 9, wherein the wireless device comprises a wireless mesh node, a mobile device, a laptop, an internet-of-things (IoT) device, or a wearable device.

14. The network access device of claim 9, wherein the instructions further cause the network access device to transmit, to the wireless device, the throughput estimate between the network access device and the wireless device.

15. The network access device of claim 9, wherein the instructions further cause the network access device to:
  determine a throughput estimate between the wireless device and an additional wireless device; and
  determine a throughput estimate between the network access device and the additional wireless device based on the throughput estimate between the network access device and the wireless device and the throughput estimate between the wireless device and the additional wireless device.

16. A network access device comprising:
one or more processors; and
a non-transitory, computer-readable storage medium storing computer instructions, which, when executed by one or more processors, cause the network access device to:
  connect a first wireless device to a network connecting a plurality of wireless devices;
  through processes at a kernel of the first wireless device:
    generate, by the first wireless device, network traffic;
    transmit, during a time window, the network traffic from the first wireless device to a second wireless device of the plurality of wireless devices; and
    receive, by the first wireless device, from the second wireless device, and during the time window, an acknowledgement of reception of the network traffic transmitted from the first wireless device;
  determine an amount of data successfully transmitted from the first wireless device to the second wireless device during the time window based on the reception of the acknowledgement; and
  determine a throughput estimate between the first wireless device and the second wireless device based on the amount of data successfully transmitted from the first wireless device to the second wireless device and an amount of time elapsed during the time window.

17. The network access device of claim 16, wherein the network is a wireless local area network (LAN).

18. The network access device of claim 16, wherein the second wireless device comprises a wireless mesh node, a mobile device, a laptop, an internet-of-things device, or a wearable device.

19. The network access device of claim 16, wherein the instructions further cause the network access device to:
  determine a throughput estimate between the second wireless device and a third wireless device of the plurality of wireless devices,
    wherein the third wireless device and the first wireless device are connected through the second wireless device; and
  determine a throughput estimate between the first wireless access device and the third wireless device based on the throughput estimate between the first wireless device and the second wireless device and the throughput estimate between the second wireless device and the third wireless device.

* * * * *